US005688848A

United States Patent [19]
Cella et al.

[11] Patent Number: 5,688,848
[45] Date of Patent: Nov. 18, 1997

[54] POLYIMIDE COMPOSITION AND POLYIMIDE COMPOSITE

[75] Inventors: James A. Cella, Clifton Park; Gary K. Shank, Ballston Spa; Judith A. Serth, Slingerlands, all of N.Y.

[73] Assignee: General Electric Company, Cincinnati, Ohio

[21] Appl. No.: 736,214

[22] Filed: Oct. 25, 1996

[51] Int. Cl.⁶ .................. C08K 7/06; C08K 5/523
[52] U.S. Cl. .............. 524/141; 428/473.5; 524/143; 524/495
[58] Field of Search ............ 524/141, 143, 524/495; 548/461; 428/473.5; 528/322; 525/436

[56] References Cited

U.S. PATENT DOCUMENTS

| | | | |
|---|---|---|---|
| 3,179,633 | 4/1965 | Endrey | 260/78 |
| 3,234,181 | 2/1966 | Olivier | 260/47 |
| 3,356,648 | 12/1967 | Rogers | 260/47 |
| 3,407,176 | 10/1968 | Loncrini | 260/47 |
| 3,422,061 | 1/1969 | Shellbourne | 260/47 |
| 3,424,718 | 1/1969 | Angelo | 260/47 |
| 3,565,847 | 2/1971 | Dileone | 524/143 |
| 3,629,180 | 12/1971 | Yoda et al. | 260/30.6 |
| 3,761,445 | 9/1973 | Balme et al. | 524/143 |
| 3,959,350 | 5/1976 | Rogers | 260/47 |
| 4,048,142 | 9/1977 | Takeoshi | 260/47 |
| 4,238,538 | 12/1980 | Manwiller | 428/36 |
| 4,336,175 | 6/1982 | Gibbs | 524/726 |
| 4,448,957 | 5/1984 | Nagaoka | 528/351 |
| 4,477,648 | 10/1984 | Jones et al. | 528/185 |
| 4,524,171 | 6/1985 | Bakshi et al. | 524/376 |
| 4,540,763 | 9/1985 | Kirchhoff | 526/281 |
| 4,568,715 | 2/1986 | Itatani et al. | 524/348 |
| 4,569,988 | 2/1986 | Scola et al. | 528/353 |
| 4,576,857 | 3/1986 | Gannett et al. | 428/260 |
| 4,612,361 | 9/1986 | Peters | 528/185 |
| 4,631,335 | 12/1986 | Scola et al. | 528/353 |
| 4,661,193 | 4/1987 | Kirchhoff et al. | 526/280 |
| 4,680,373 | 7/1987 | Gallagher et al. | 528/185 |
| 4,725,642 | 2/1988 | Gannett et al. | 524/600 |
| 4,794,157 | 12/1988 | Berdahl et al. | 528/208 |
| 4,795,827 | 1/1989 | Bruza et al. | 525/436 |
| 4,855,391 | 8/1989 | Berdahl et al. | 528/188 |
| 4,864,015 | 9/1989 | Cella et al. | 528/352 |
| 4,874,835 | 10/1989 | Berdahl | 528/179 |
| 4,876,329 | 10/1989 | Chiang et al. | 528/353 |
| 4,877,653 | 10/1989 | Vora et al. | 427/385.5 |
| 4,923,960 | 5/1990 | Chen et al. | 528/351 |
| 4,925,915 | 5/1990 | Mueller et al. | 528/353 |
| 4,963,647 | 10/1990 | Vora et al. | 528/351 |
| 5,013,817 | 5/1991 | Ohta et al. | 525/436 |
| 5,055,550 | 10/1991 | Mueller et al. | 528/353 |
| 5,177,180 | 1/1993 | Griffin et al. | 528/353 |

FOREIGN PATENT DOCUMENTS

| | | |
|---|---|---|
| 0323912 | 12/1989 | European Pat. Off. |
| 81 18387 | 2/1982 | France |

*Primary Examiner*—Veronica P. Hoke
*Attorney, Agent, or Firm*—Andrew C. Hess; David L. Narciso

[57] ABSTRACT

A polyimide composition and polyimide composite are provided. The composition has a polyimide resin, a reactive plasticizer and a phosphate. The composition is crosslinked and exhibits desired levels of processability and improved thermooxidative stability. The composites have a polyimide resin, a phosphate and reinforcing fibers, and exhibit reduced wear and friction. The compositions and composites are useful for making aircraft engine hardware such as bushings.

8 Claims, No Drawings

POLYIMIDE COMPOSITION AND POLYIMIDE COMPOSITE

BACKGROUND OF THE INVENTION

1. Field of the Invention

The present invention relates to polyimides and polyimide composites, and more particularly relates to stabilized polyimides and polyimide composites.

2. Description of the Related Art

Polyimides are well-known in the art and have been widely used in applications requiring high thermal stability and oxidative stability. Polyimides are generally obtained by reacting specific tetracarboxylic acids or dianhydrides with primary diamines to obtain polyamic acids which can subsequently be converted to the corresponding polyimide.

Various polyimides are disclosed in Griffin et al U.S. Pat. No. 5,177,180 issued Jan. 5, 1993, Gibbs U.S. Pat. No. 4,336,175 issued June 1982, and U.S. Pat. No. 3,433,061, 3,234,181, 3,424,718, 3,959,350, 3,407,176, 4,612,361, 4,680,373, 4,794,157, 4,864,015, all of which are incorporated herein by reference. There is also a general knowledge that polyimide compositions may be used to make composites that are useful as aircraft engine hardware. The use of triarylphosphates in the stabilization of polyimides against thermal and thermooxidative degradation is also known.

As set out above, polyimides are a class of polymers noted for their excellent thermal and thermooxidative stability. Polyimides having glass transition temperatures greater than 400 degrees Celsius are known, and are often the materials of choice for high temperature applications in harsh environments, particularly for use in fiber reinforced composites. In many uses which employ polyimide matrix resins, such as stator vane bushings for high performance aircraft engines, the final composite part is subjected to substantial physical degradation resulting from friction and wear of the part during normal operating conditions.

For cross-linked polyimide compositions, there is a general desire to improve their processability and thermooxidative stability, and for polyimide composites there is a general desire to improve their friction/wear characteristics.

SUMMARY OF THE INVENTION

The present invention involves polyimide compositions and composites. The polyimide compositions are cross-linked compositions comprising (a) a polyimide resin, (b) a reactive plasticizer and (c) a triaryl phosphate. The compositions exhibit enhanced thermooxidative stability and desired processability. The composites comprise (a) reinforcing fiber, (b) a polyimide resin and (c) a triaryl phosphate. The composites are useful for making certain aircraft hardware components and exhibit reduced friction and improved wear resistance. The cross-linking of the polyimide in the presence of the triphenylphosphate is a surprising result considering the antioxidant nature of this stabilizer. The considerably improved friction and wear rates of bushings fabricated from the present composites compared to bushings made from composites with the same polyimide without the added phosphate is an unanticipated result.

DETAILED DESCRIPTION OF THE INVENTION

Polyimides are generally obtained by the intercondensation reaction of dianhydrides or derivatives thereof and diamines, preferably aromatic diamines.

The dianhydrides are preferably of the formula:

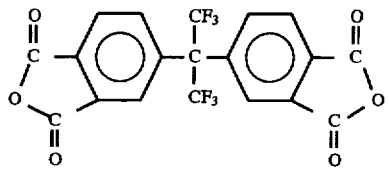

or derivatives thereof, including halogen (Cl, F or Br), alkyl or aryl substituted derivatives.

The above dianhydrides, or derivatives thereof, may be mixed with other dianhydrides, such as those represented by the formulas:

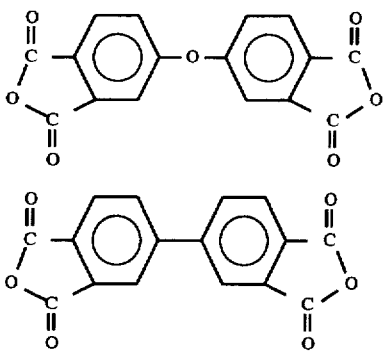

The aromatic diamines are preferably of the formula:

$$H_2N-R-NH_2$$

wherein R is a divalent aromatic hydrocarbon radical having from 6 to 20 carbon atoms and halogenated derivatives thereof.

The preferred dianhydrides are hexafluoroiso propylidene-bisphthalic anhydride also referred to as 2,2'-bis'(3,4-carboxy)phenyl-1,1,13,3,3-hexafluoropropane dianhydride, and biphenyl-3,3',4,4'-tetracarboxylic acid dianhydride.

The aromatic diamines can be any of the aryl diamines or aromatic diamines well known in the art. Among the aromatic diamines or mixtures thereof which may be used in the polyimides include for example, meta-phenylenediamine; para-phenylenediamine; 4,4'-diaminodiphenyl propane; 4,4'-diaminodiphenylmethane; benzidine; 4,4'-diaminodiphenyl sulfide; 4,4'-diaminodiphenyl sulfone; 4,4'-diaminodiphenyl ether; 1,5-diaminonaphthalene; 3,3'-dimethylbenzidine; 3,3'-dimethoxybenzidine; 2,4-bis(beta-amino-t-butyl)toluene; bis(p-beta-methyl-o-aminopentylbenzene; 1,3-diamino-4-isopropylbenzene; m-xylylenediamine; p-xylylenediamine; 2,4-diaminotoluene; and 2,6-diaminotoluene. Metaphenylenediamine, para-phenylenediamine and mixtures thereof are preferred.

Processes for making polyimides are generally well known and involve mixing the dianhydrides and diamines in the presence of a solvent.

The reactive plasticizer is a bis-biphenylene additive having a 4 membered ring which undergoes ring scission at an elevated temperature. The reactive plasticizer is preferably of the formula:

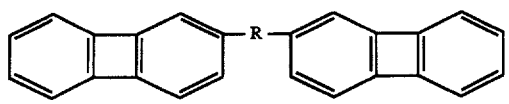

wherein R is a moiety having aromatic groups, and preferably R has from 36 to 60 carbon atoms. Preferably the reactive plasticizer is of the formula:

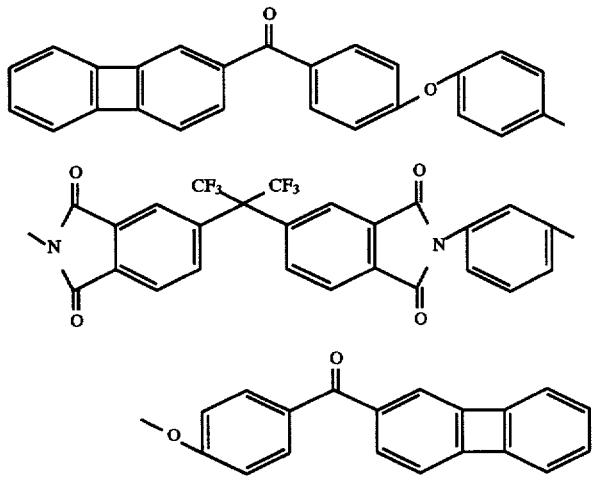

The reactive plasticizer preferably has at least two four-membered rings.

The triaryl phosphate ester is preferably selected from the group consisting of triphenyl phosphate, tricresylphosphate and trinaphthylphosphate.

The polyimide composition comprises (a) polyimide resin, (b) reactive plasticizer and (c) an aromatic phosphate. The polyimide resin is preferably present at a level of from 70 to 95 percent by weight based on the total weight of the composition, more preferably from 75 to 90 percent by weight thereof, and most preferably from 80 to 85 percent by weight thereof. The reactive plasticizer is preferably present at a level of from 5 to 25 percent by weight based on the total weight of the composition, more preferably from 10 to 20 percent by weight thereof, and most preferably from 12 to 17 percent by weight thereof. The aromatic phosphate is preferably present at a level of from 0.25 to 5 percent by weight based on the total weight of the composition, more preferably from 0.5 to 2 percent by weight thereof, and most preferably from 0.7 to 1.3 percent by weight thereof. The compositions unexpectedly exhibit the desired level of cross-linking even though the phosphate (an anti-oxidant which would be expected to inhibit cross-linking) is present at high levels. The compositions exhibit desired levels of processability and high temperature stability.

The polyimide composites and articles made therefrom, unexpectedly exhibit reduced friction and reduced wear due to the presence of the aromatic phosphate.

Suitable articles made from the composites include for example bushings for aircraft and other aircraft hardware. The articles/composites may be in the form of laminates. The articles may be washers, bushings, exhaust flaps and ducts in aircraft engines.

The composite (and article) comprise (a) polyimide resin, (b) reinforcing fiber and (c) aromatic phosphate. The polyimide is preferably present at a level of from 20 to 90 percent based on the total weight of the composite, more preferably from 20 to 70 percent by weight thereof, and most preferably from 40 to 60 percent by weight thereof. The reinforcing fiber is preferably present at a level of from 10 to 80 percent by weight based on the total weight of the composite, more preferably from 20 to 70 percent by weight thereof, and most preferably from 40 to 60 percent by weight thereof. The aromatic phosphate is preferably present at a level of from 0.1 to 5 percent by weight based on the total weight of the composite, more preferably from 0.25 to 4 percent by weight thereof, and most preferably from 0.25 to 2 percent by weight thereof. The combination of polyimide and phosphate in the composite is preferably in a weight ratio of between 99.5:0.5 and 98:2. The reactive plasticizer may also be present in the composite and article.

The reinforcing fiber is preferably a graphite fiber (carbon fiber).

The following examples are meant to illustrate the present invention and the present invention is not meant to be limited to the following examples. The compositions of the present invention may also contain or be free of various conventional additives and fillers.

EXAMPLES

Various combinations of monomers were used to produce the following polyimide resins. The monomers were biphenyl-3,3',4,4'-tetracarboxylic acid dianhydride (BPDA); 2,2'-bis'(3,4-carboxy)phenyl-1,1,1,3,3,3-hexafluoropropane dianhydride (6FDA); p-phenylenediamine (PPD); and m-phenylenediamine (MPD). The aromatic phosphate used was triphenylphosphate. The reactive plasticizer used was of the formula:

TABLE 1

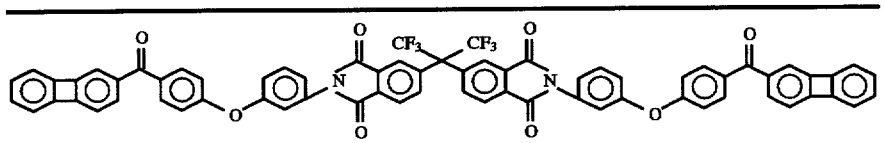

Weight Loss of Polyimide Films
After 200 hours at 700 degrees F.

| Polymer | Weight Loss (unstabilized) | (stabilized) |
| --- | --- | --- |
| BPDA/PPD | 13.0 | 6.2 |
| BPDA/MPD/PPD | 12.0 | 5.7 |
| BPDA/MPD | 12.0 | 10.6 |
| BPDA/6FDA/PPD | 13.0 | 7.5 |

TABLE 1-continued

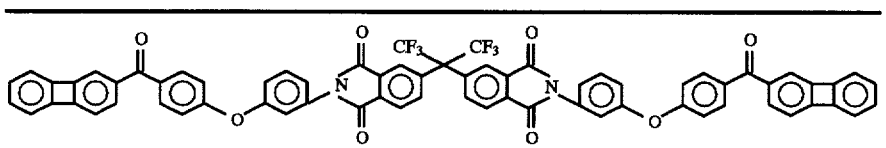

Weight Loss of Polyimide Films
After 200 hours at 700 degrees F.

| Polymer | Weight Loss (unstabilized) | Weight Loss (stabilized) |
|---|---|---|
| BPDA/6FDA/MPD/PPD | 13.2 | 5.3 |
| BPDA/6FDA/MPD | 15.3 | 7.4 |
| 6FDA/PPD | 14.0 | 13.3 |
| 6FDA/MPD/PPD | 22.3 | 13.0 |
| 6FDA/MPD | 19.4 | 11.4 |

The films contained 15 percent by weight of the reactive plasticizer. The stabilized films contained 1 percent by weight triphenylphosphate.

TABLE 2

SOFTENING TEMPERATURES FOR POST BAKED POLYMERS

| Polymer | Softening Temperature (TMA) | | |
|---|---|---|---|
| | Resin | Resin + RP | Resin + S + RP |
| BPDA/PPD | 423 | 466 | 397 |
| BPDA/MPD/PPD | 301 | 424 | 398 |
| BPDA/MPD | 355 | 385 | 341 |
| BPDA/6FDA/PPD | 404 | 370 | 410 |
| BPDA/6FDA/MPD/PPD | 362 | 375 | 385 |
| BPDA/6FDA/MPD | 338 | 365 | 375 |
| 6FDA/PPD | a | a | 406 |
| 6FDA/MPD/PPD | 337 | 431 | 382 |
| 6FDA/MPD | 330 | 390 | 408 |

The post baked polymers were obtained by "curing" at 400 degrees Celsius for 18 hours in nitrogen. The softening temperatures demonstrate that crosslinking occurs in polymers containing both the reactive plasticizer alone and the reactive plasticizer and phosphate in combination. In nearly all cases, the softening temperatures of the films containing reactive plasticizer is higher than that of the control after post curing. Those polymers having softening temperatures near or above 400 degrees Celsius would not be expected to undergo appreciable cross linking since they were cured below their glass transition temperature. The combination of stabilizer and reactive plasticizer added to the polyimide resin serves to enhance processability while providing dimensional and thermooxidative stability to polyimide resins. Surprisingly, cross linking of the resins induced by the reactive plasticizer is not inhibited by the phosphate.

In the course of evaluating a number of polyimide resin compositions as candidates for a composite busing application, it was noted that those resins which contained 0.5–2 percent by weight of a triarylphosphate additive employed as a stabilizer against oxidative degradation, exhibited considerably improved friction and wear rates compared to bushings fabricated from the same resins without the added phosphate. This result was completely unexpected.

The data for stator vane bushings fabricated from a polyimide derived from 6FDA and PPD is presented in Table 3. Data for compositions with and without 1 percent by weight triphenylphosphate additive are presented.

Prepreg solutions A and B were prepared as follows: A 200 ml flask was charged with 48.4 g (0.11 mol) of 6FDA, 3.96 g (–0.22 mol) of $H_2O$ and 65 g (69 ml) of diethyleneglycol dimethyl ether (diglyme). The magnetically stirred mixture was heated to reflux until a homogeneous solution was obtained (30 minutes). When the solution had cooled to ambient temperature, 11.88 g (0.11 mol) of PPD was added. Solution B was prepared in an identical fashion except that 1.5 g of triphenyl phosphate was added to the final solution.

These solutions were dip coated onto braided carbon fiber and the coated braids were heated at 210 degrees F. for 1 hour in a forced air oven. The braids were then cut into 1" pieces and placed in a heated mold. The mold was heated to 600 degrees F. over about a 10 minute period with little or no pressure applied. Approximately 2 tons platen pressure was then applied and the molds were heated to 800 degrees F. and held at that temperature for 10 minutes. The mold was cooled under pressure and the bushings were removed from the mold. The finished bushings were then submitted for friction/wear testing at 700 degrees F. using a 25 pound vane loading. Weight loss and wear rate data from bushing prepared from prepregs A and B are present in Table 3.

TABLE 3

Bushing Wear Test Results

| Resin | % wtls1 | cycles | % wtls2 | wear |
|---|---|---|---|---|
| A | 4.08 | 516183 | 0.79 | 0.0023 |
| A | 4.68 | 506672 | 0.92 | 0.0014 |
| A | 4.77 | 631417 | 0.75 | 0.0022 |
| B | 2.92 | 504958 | 0.58 | 0.0018 |
| B | 2.56 | 526011 | 0.49 | 0.0011 |
| B | 3.67 | 592599 | 0.62 | 0.0015 |

The % wtls1 column sets out the percent weight loss. The % wtls2 column sets out the percent weight loss per 100,000 cycles. The wear column sets out the wear per 100,000 cycles.

What is claimed is:

1. A cross-linked polyimide composition obtained by combining:

(a) a polyimide resin, (b) a reactive plasticizer having at least two four-membered rings which undergo ring scission at an elevated temperature, said plasticizer being combined at a level of from 5 to 25 percent by weight based on the total weight of the composition, wherein said reactive plasticizer is of the formula:

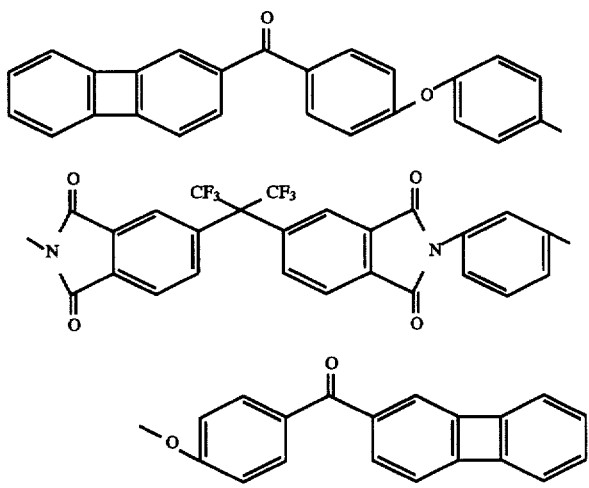

and (c) a triaryl phosphate, said phosphate being combined at a level of from 0.25 to 5 percent by weight based on the total weight of the composition.

2. The composition of claim 1 wherein said polyimide is a reaction product of hexafluoroisopropylidene-bisphthalic anhydride and an aromatic diamine.

3. The composition of claim 1 wherein said phosphate is triphenylphosphate.

4. A composite useful for making bushings, said composite comprising:
  (a) a polyimide resin, said polyimide being present at a level from 20 to 90 percent by weight based on the total weight of the composite,
  (b) a graphite reinforcing fiber, said reinforcing fiber being present at a level of from 10 to 80 percent by weight based on the total weight of the composite, and
  (c) an triaryl phosphate, said phosphate being present at a level of from 0.1 to 5 percent by weight based on the total weight of the composite.

5. The composite of claim 4 wherein said polyimide resin is a reaction product of hexafluoroisopropylidene-bisphthalic anhydride and an aromatic diamine.

6. The composite of claim 4 wherein said graphite fiber is present at a level of from 40 to 60 percent by weight based on the total weight of the composite.

7. The composite of claim 4 wherein said phosphate is present at a level of from 0.25 to 4 percent by weight based on the total weight of the composite.

8. An article made from the composite of claim 6.

* * * * *